Feb. 10, 1925.                                                              1,526,282
G. HEY ET AL
MULTIPLE SPINDLE DRILL HEAD
Filed April 4, 1923           2 Sheets-Sheet 2

INVENTOR.
George Hey
Stanley Carlton Smith
By
Attorney

Patented Feb. 10, 1925.

1,526,282

UNITED STATES PATENT OFFICE.

GEORGE HEY, OF MIDDLESEX, AND STANLEY CARLTON SMITH, OF LUTON, ENGLAND.

MULTIPLE-SPINDLE DRILL HEAD.

Application filed April 4, 1923. Serial No. 629,883.

*To all whom it may concern:*

Be it known that we, GEORGE HEY, a subject of the King of Great Britain, residing at Middlesex, England, and STANLEY CARLTON SMITH, a subject of the King of Great Britain, residing at Luton, Bedfordshire, England, have invented new and useful Improvements in Multiple-Spindle Drill Heads, of which the following is a specification.

This invention relates to multiple spindle drill heads having two or more spindles and adapted for example, for drilling all the bolt holes in a flange of a pipe, valve, gland or the like at one operation. The spindles may be set at equal distances apart and mounted so that they can be simultaneously adjusted to enlarge or reduce the pitch circle on which the holes to be drilled are situated whilst maintaining the several spindles spaced apart equally. This adjustment can be made with the aid of graduation marks provided on a convenient part of the drill head, thus avoiding the necessity of using separate measuring instruments when bringing the spindles into any required adjustment.

In a convenient arrangement according to this invention, the drill head comprises a gear box which can be attached to a radial arm or any other type of drilling machine, and supports a centrally arranged spindle which can be coupled to the drill spindle of the machine to which the head is attached. This central spindle carries a pinion in gear with pinions mounted on fixed pins within the gear box and each of these pins carries a disc in which a drill spindle is mounted eccentrically. Each pin also carries a pinion in gear with a pinion on the eccentrically mounted drill spindle. Means are provided for rotating all the discs simultaneously to adjust the positions of the drill spindles with reference to the central spindle and this can be done without putting any of the drill spindles out of driving connection with the central spindle.

In the accompanying drawing:—

Figure 1:
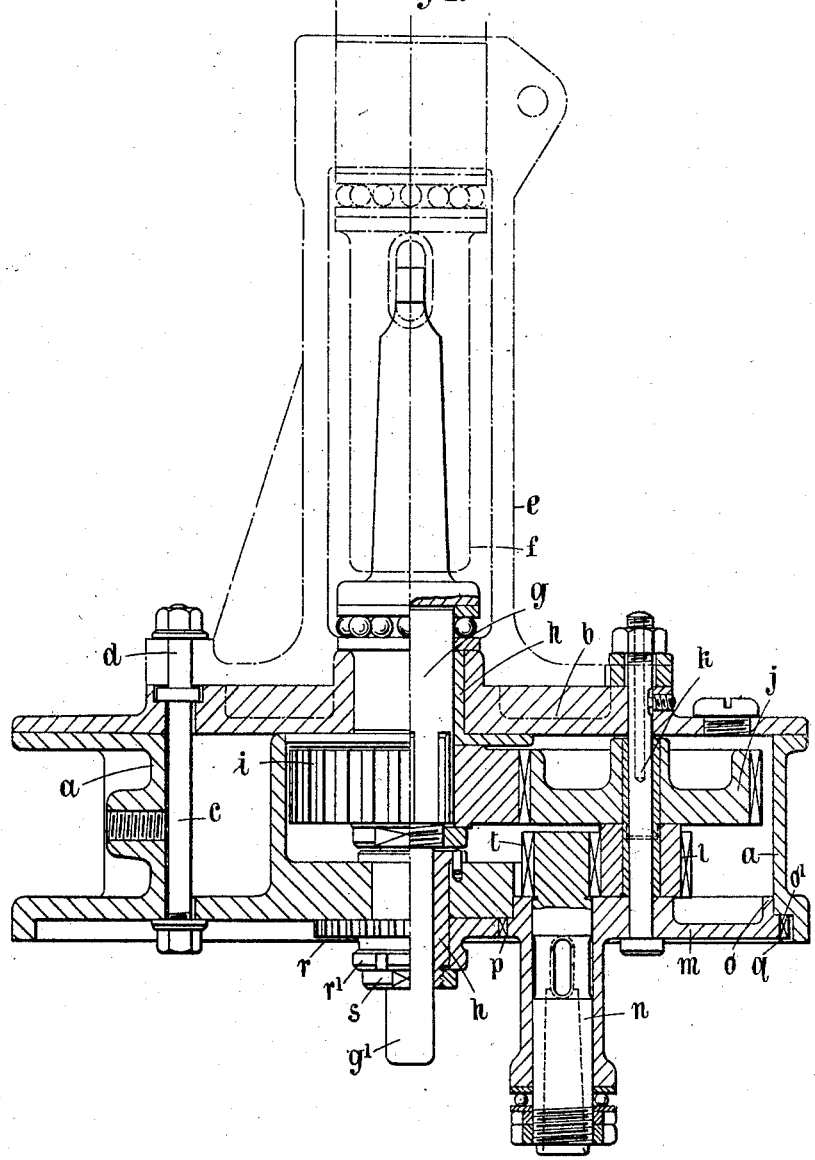
Figure 1 shows a vertical section of a multiple spindle drill head constructed in accordance with this invention on two planes as indicated by the arrows A—A, Figure 2.
Figure 2:
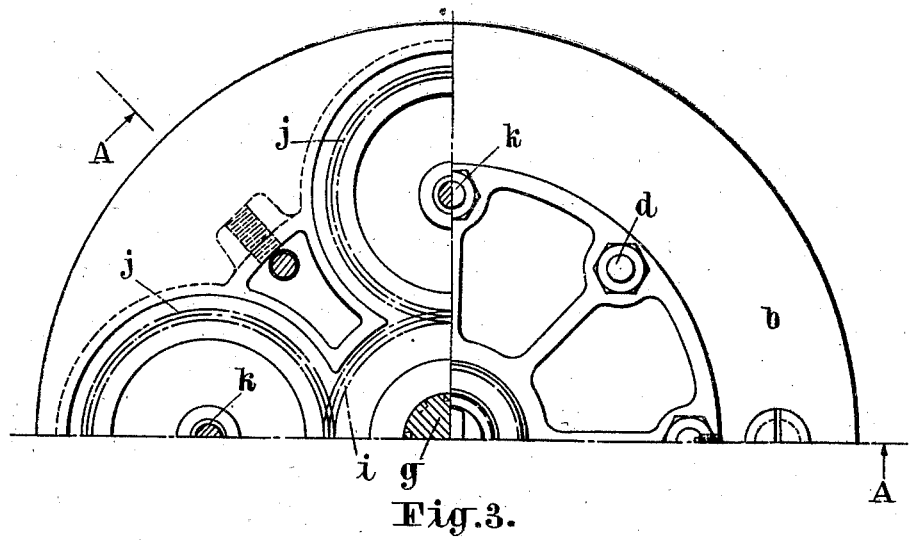
Figure 2 is a half plan view of the said drill head, the cover plate of the gear box being removed from the left hand portion of the drawing.

As shown in this drawing, $a$ is a gear box provided with a cover plate $b$ secured to the gear box by bolts $c$ which are formed with extensions $d$ by means of which the drill head can be secured to a suitable support or adapter, indicated in broken lines at $e$ in Figure 1, provided to support the drill head on a drilling or other machine in such a position that a spindle (indicated in broken lines at $f$) of the machine can be coupled to a spindle $g$ supported centrally in bearings $h$ in the gear box.

The spindle $g$ carries a pinion $i$ in gear with pinions $j$ rotatably mounted on fixed pins $k$ carried by the gear box. From a consideration of Figure 3 it will be apparent that the machine illustrated comprises four such pins $k$ each of which also carries a pinion $l$ rotated by the pinion $j$ through a suitable coupling, and a disc $m$ in which a drill spindle $n$ is eccentrically mounted so that by rotation of the disc $m$ the distance of the spindle $n$ from the spindle $g$ can be varied. The disc $m$ is formed with a cylindrical portion or flange $o$ stepped in a housing or hole $p$ in the gear box base, and with teeth $q$ in gear with a pinion $r$ supported loosely on the central spindle $g$ by a nut $s$ the said pinion being provided with a notched hub $r'$ to facilitate rotation of this pinion $r$ by means of a suitable tool. The disc $m$ can be held in any required position with reference to the gear box by tightening the nut on the bolt $k$ so as to clamp the disc against a shoulder $o'$ in the base of the said box. The spindle $n$ carries a pinion $t$ in gear with the pinion $l$ providing a driving connection from the machine spindle $f$ to the drill spindle $n$.

The pins $k$ can be spaced equally apart on a pitch circle concentric with the spindle $g$, the discs $m$ can be made of equal size, and the eccentricity of the spindles $n$ may be equal in all the discs. The discs can then be adjusted so that the spindles $n$ are equally spaced apart on the same pitch circle concentric with the spindle $g$ and thereafter the pinion $r$ can be brought into gear with the teeth $q$ of all the discs which can then be rotated simultaneously thereby to move the spindles $n$ equally towards or from the spindle $g$, the said spindles $n$ being at all times equally spaced apart one from another.

Moreover, as the discs $m$ are rotated about the pins $k$ the pinions $t$ run round the pinions $l$ (rotating the spindles $n$ idly) without breaking the gear connection of the pinions $t$ with the pinion $i$, through the pinions $l$, $j$.

Figure 3:
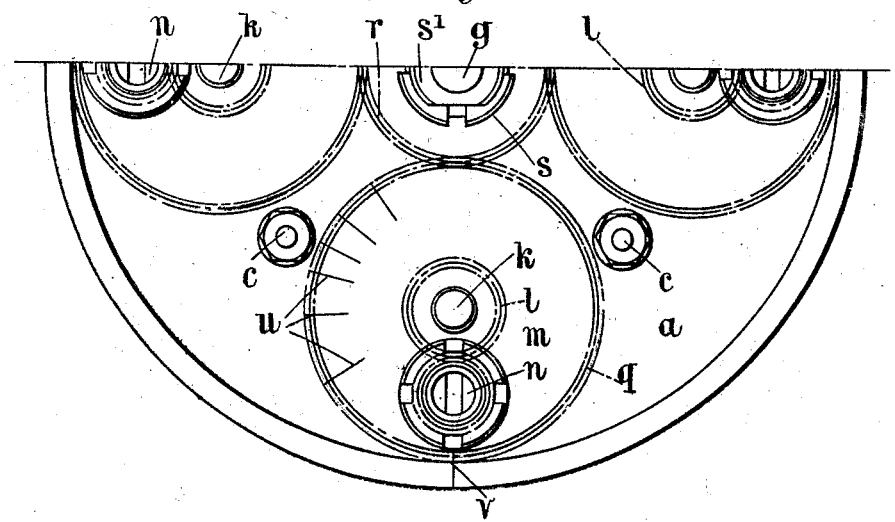
Figure 3 is a half underside view of the drill head.

One of the discs $m$, as shown in Figure 3, may have graduations $u$ marked thereon which, when opposite a datum mark $v$ on the gear box, indicate the diameter of the pitch circle on which the spindles $n$ are then arranged. In Figure 1 the spindle $n$ shown occupies its closest position to the spindle $g$ and in Figure 3 the spindles $n$ are shown occupying the most remote positions from the said spindle $g$.

By withdrawing the pinion $r$ from engagement with the teeth $q$ on the discs $m$, after unscrewing the nut $s$, the position of each disc can be adjusted independently and the discs can then be locked in these positions by means of the bolts $k$, or otherwise.

The spindle $g$ as shown in Figure 1, is extended downwardly to provide a part $g'$ which can be used to position the drill head with reference to a template or the like, and to steady the drill head, if required, by entering a hole provided therefor, for example, in a template or jig.

We claim:—

1. A multiple spindle drill head, comprising a gear box having a plurality of cylindrical housings in its base, a plurality of rotatably adjustable discs each having a continuous cylindrical flange stepped in one of the cylindrical housings of the gear box for rotation in the latter, and a drill spindle eccentrically mounted in each of said discs.

2. A multiple spindle drill head, comprising a gear box having a plurality of cylindrical housings in its base, a plurality of discs each having a continuous cylindrical flange stepped in one of said housings, a drill spindle eccentrically mounted in each of said discs, and means for equally and simultaneously rotatably adjusting all of said discs.

3. A multiple spindle drill head, comprising a gear box having a plurality of cylindrical housings in its base, a plurality of rotatably adjustable discs each having gear teeth on its periphery and each having a continuous cylindrical flange stepped in one of said housings, a drill spindle eccentrically mounted in each of said discs, and a pinion arranged centrally of said discs and in gear with the toothed peripheries of all of said discs.

4. A multiple spindle drill head, comprising a gear box having a plurality of cylindrical housings in its base, a plurality of rotatably adjustable discs each having a continuous cylindrical flange stepped in one of said housings, a drill spindle eccentrically mounted in each of said discs, a pinion carried by each of said spindles, a driving spindle having bearing in said gear box, a plurality of pins carried by the gear box, and a plurality of pinions each rotatably mounted on one of said pins and in gear respectively with the pinions of said drill spindles and the pinion of said driving spindle.

GEORGE HEY.
STANLEY CARLTON SMITH.

Witnesses:
GEORGE HARRISON,
CHAS. F. MURPHY.